May 21, 1963
J. P. HOFFMAN
3,090,858
BAFFLE FOR THE PROTECTION OF AUTOMOBILE
HEADLIGHTS AND PARKING LIGHTS
Filed Feb. 9, 1961
2 Sheets-Sheet 1
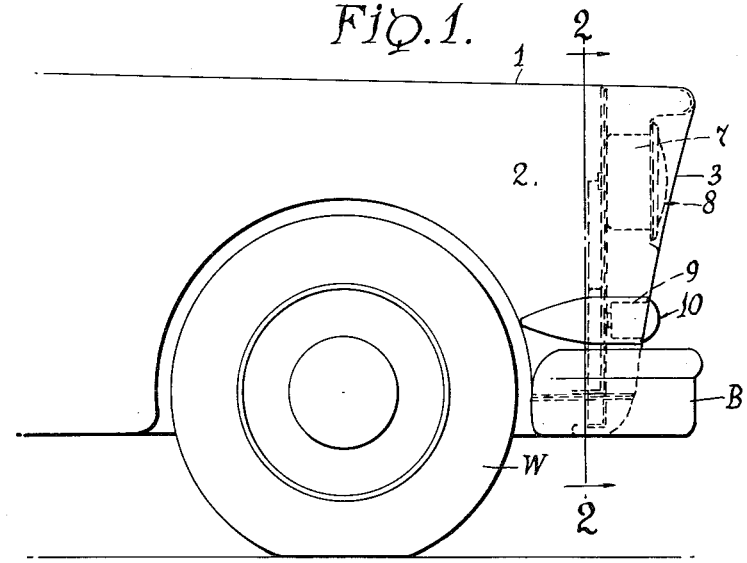
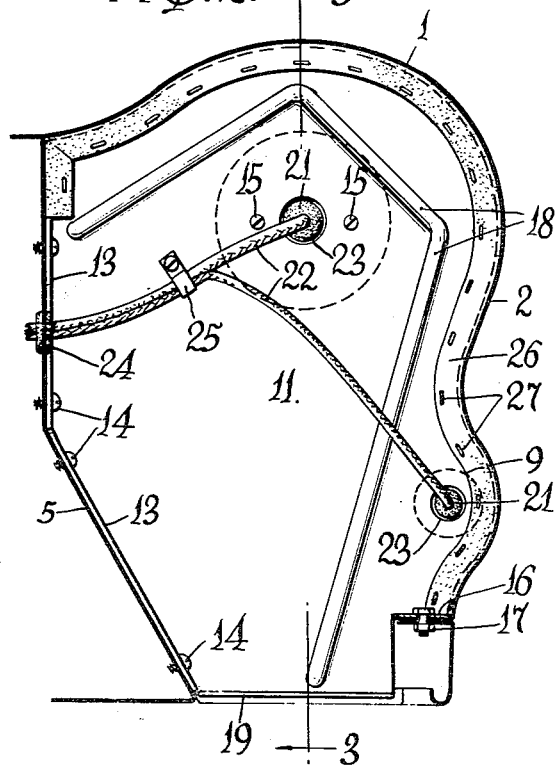
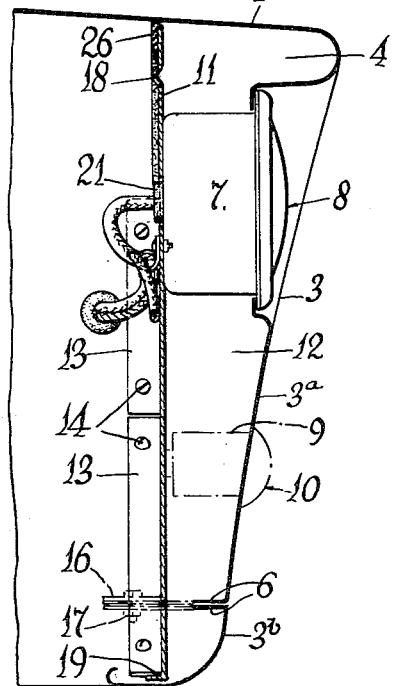
INVENTOR.
James P. Hoffman,
BY
John Powers
ATTORNEY May 21, 1963
J. P. HOFFMAN
3,090,858
BAFFLE FOR THE PROTECTION OF AUTOMOBILE
HEADLIGHTS AND PARKING LIGHTS
Filed Feb. 9, 1961
2 Sheets-Sheet 2
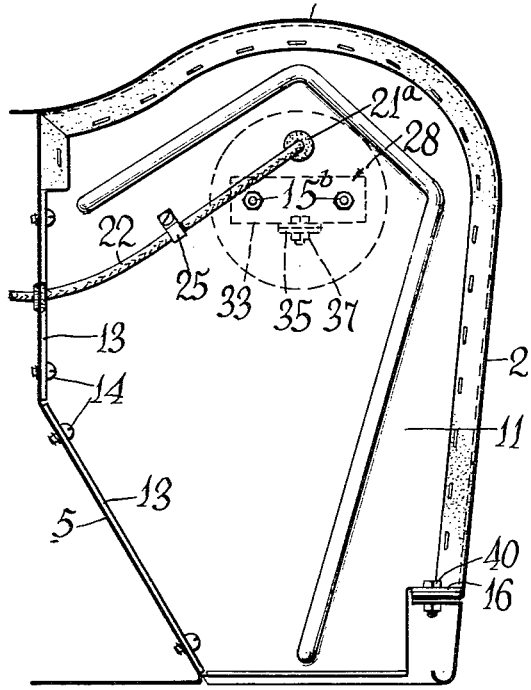
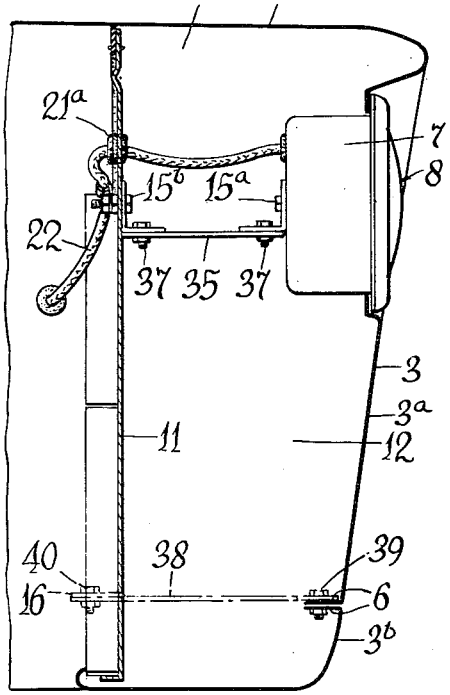
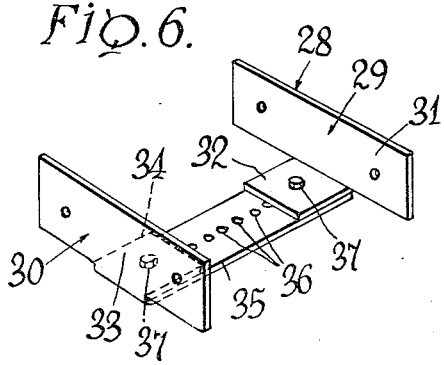
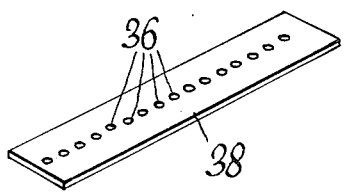
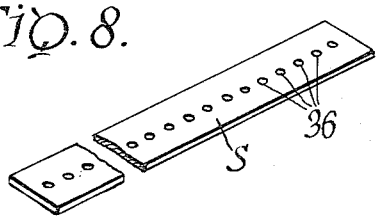
INVENTOR.
James P. Hoffman,
BY John Lowers
ATTORNEY United States Patent Office 3,090,858
Patented May 21, 1963

3,090,858
BAFFLE FOR THE PROTECTION OF AUTOMOBILE
HEADLIGHTS AND PARKING LIGHTS
James P. Hoffman, West Valley, N.Y.
Filed Feb. 9, 1961 Ser. No. 88,080
3 Claims. (Cl. 240—7.1)

In automobiles of current design each front fender delimits an inutile chamber and has a chamber closure wall at its front end which provides support in advance of the front wheels for the headlight and parking light units, each of which includes a casing for the electric lamp.

The front wheels pick up debris, i.e. soft mud, water and salt laden slush, from the road surface and throw such debris with considerable force in a forward direction into the fender chambers, the debris accumulating behind the front closure walls and in the several pockets which may characterize particular fender designs. The debris thus deposited accumulates upon the casings of the light units and over a period of time causes rusting and corrosion of the light unit casings in a degree such as to necessitate the replacement of the units.

The invention has as its principal object the protection of the casings of the light units against rusting and corrosion in consequence of the debris thrown into the fender chambers by the front wheels and proposes a structural device which may be called a baffle and is so mounted within the fender chamber as to provide at the front end of the chamber a completely occluded housing within which the headlight and parking light units are arranged and to present a physical barrier to the passage of the debris into such housing.

Ancillary objects are the provision of a baffle for the purpose stated which may quickly and with facility be mounted in the front fender chambers of any automobile of current design, which will be free from vibration and hence will be noiseless in use and which, in respect to its unattached edges, will avoid metal to metal contact with the fender walls without impairment of complete sealing effect in respect to the occluded housing within which the light units are arranged.

The baffle of the invention is an independent article of manufacture and sale which may readily be incorporated with automobile fenders in the course of the manufacture of the automobile bodies and may also be distributed for use in automobile repair shops.

The designs of the front fenders vary in cross sectional outline and in a number of other respects in automobiles of different manufacturers and in different models of automobiles of the same manufacturer. They also vary in the customary changes of automobile body designs from year to year. The reference to automobiles of "current design" therefore contemplates fender constructions wherein the headlights and parking light units are supported by or in relation to the closure walls at the front ends of the fender chambers. Thus the variations in fender design are manifold. The baffle of the invention, serving the purposes and having the characteristics above stated, may readily be incorporated with a particular fender of any current design, its adaptability in this regard involving the selection of an outline and dimensions conforming to the cross-sectional outline and dimensions of the fender chamber in vertical transverse plane thereof just behind the casings of the light units and the provision of such parts or features as may be necessary for its support and for the electrical connection of the headlights and parking lights.

The front fender is shown schematically in the drawings, such showing being sufficient for the illustration of the baffle of the invention and of its mounting within the fender chamber.

In the drawings:

FIGURES 1, 2 and 3 illustrate a construction wherein the baffle is attached directly to the rear wall of the casing of the headlight.

FIGURE 1 is a side elevation of the front fender portion of an automobile in which the baffle and the casings for the headlights and the parking lights are shown in dot and dash lines.

FIGURE 2 is a vertical transverse sectional view on the line 2—2 of FIGURE 1 looking in the direction of the arrows.

FIGURE 3 is a vertical longitudinal sectional view on the line 3—3 of FIGURE 2 looking in the direction of the arrows, the casing of the headlight being shown in elevation.

FIGURES 4 through 7 illustrate a construction wherein the fender is of such design that the baffle is required to be spaced from the rear wall of the headlight and is connected to it for intermediate support by a suitable bracket. Inasmuch as the parking light has been sufficiently indicated in FIGURES 1 and 2 it has, for the reason of simplicity of illustration, been omitted from FIGURES 4 and 5.

FIGURE 4 is a vertical transverse sectional view showing the baffle mounted within the fender chamber, the section being in a plane, for example the plane 2—2 of FIGURE 1, suitably in the rear of the baffle.

FIGURE 5 is a vertical longitudinal sectional view showing the baffle as mounted within the fender chamber.

FIGURE 6 is a perspective view of the bracket for the intermediate support of the baffle from the headlight.

FIGURE 7 is a perspective view of a strap for the support of the baffle at another point.

FIGURE 8 is a perspective view of a strip of metal of indefinite length from which are cut a strap forming part of the bracket 6 and the strap shown in FIGURE 7.

Referring to FIGURES 1, 2 and 3:

The fender includes a top wall 1, an outer side wall 2 and a front wall 3, these walls delimiting an inutile chamber 4 which is completed by an inner wall or skirt 5 connected to and depending from the wall 1 and in certain designs of automobile bodies having the sectional outline of an obtuse angle as shown in FIGURE 2. The front wall 3 provides a front closure for the chamber 4 and includes an upper section 3a and a lower section 3b, these sections being formed with adjoining inwardly extending flanges 6 which are connected by spot welding, the seam between the sections 3a and 3b being concealed by the front bumper B. The front wall section 3a carries the casing 7 of the headlight unit 8 and the casing 9 of the parking light unit 10. The headlight and parking light casings are arranged in advance of the front wheels W, these being mounted in alinement with the chamber 4. The wheels W pick up from the road surface such debris as soft mud, water and salt laden slush and throw it with considerable force in a forward direction into the chamber 4. This debris collects upon the casings of the headlight units 8 and parking light units 9 and over a period of time, frequently relatively short, causes such rusting and corrosion of these casings that the units become inoperative and must be replaced. Such replacement may be required several times during the life of the car.

The baffle of the invention is fashioned from sheet metal of suitable gauge, preferably 26-gauge galvanized metal, and occupies a vertical transverse plane within the chamber 4, the baffle, designated 11, being shaped to conform to the cross sectional outline and dimensions of the chamber and preferably having three-point support, that is to say from the skirt 5, from the casing 7 of the headlight unit and from the flange 6 of the front wall section 3a. The baffle 11 is arranged behind the headlight casing 7 and the parking light casing 9 and provides at the front of the fender a chamber 12 which is completely occluded from the part of the fender chamber 4 behind the baffle and within which the casings 7 and 9 are positioned, the chamber 12 being delimited by the baffle, the front part of the fender side wall 2, the front part of the skirt 5 and the front wall 3. The baffle presents a physical barrier to the passage into the chamber 12 of debris thrown by the wheels W and has along its edges provision for effectively sealing the chamber 12 from the part of the chamber 4 behind the baffle.

For its support from the skirt 5 the edge of the baffle which adjoins the skirt and conforms to its outline has flanged connection to the skirt. As herein shown two rearwardly projecting flanges 13 are provided in angular relation conforming to the obtuse angle formed by the skirt and are connected to the skirt 5 by suitable fastenings such as screws 14. For its support from the headlight casing 7 the baffle is connected to its rear wall by screws 15. For its support from the fender the baffle is provided with a rearwardly extending plate-like horizontal projection 16 which may be struck up from its lower edge and rests upon the flange 6 of the front wall section 3a, the projection 16 being suitably attached to the flanges 6 in their connected relation as by a bolt and nut fastening 17.

The baffle, in order that it may be free from vibration and resultant noise, is preferably provided with a rearwardly directed stiffening rib 18 of any appropriate outline. Likewise, for the same purpose, the baffle is provided at its lower edge with a rearwardly projecting flange 19 which, in order to avoid metal to metal contact, is spaced, as shown in FIGURE 3, in a very slight degree from the bottom wall 20 of the front wall section 3b.

The rear walls of the headlight casings 7 and the parking light casings 9 carry grommets 21 for the cables 22 which carry the wires connected to the sockets of the electric lamps of the headlights 8 and parking lights 9, the baffle having openings 23 conforming in diameter to the grommets and for their accommodation. The cables 22 also extend through a grommet 24 fitted in the skirt 5 and within the chamber 4 are supported by a bracket 25 attached to the baffle 11.

The unattached edges of the baffle, these being all of the edges beyond the flanges 13, are spaced in very slight degree, merely sufficient to avoid metal to metal contact, from the fender walls to which they conform in outline. In order positively to prevent any escape of the debris into the chamber 12 through the slight spaces between the unattached edges of the baffle and the fender walls, sealing strips 26 of flexible rubber or other appropriate material are conveniently attached to the edge portions of the baffle by staples 27 and bear upon the fender walls. The flanges 13 in their attached relation to the skirt 5 and the sealing strips 26 completely seal the chamber 12 from the fender chamber 4. A seal of this character is not required at the lower edge of the baffle since the location of the flange 19 at this point and its spacing in very slight degree from the wall 20 will be effective in preventing the passage of debris into the chamber 12 to any appreciable degree.

Referring to FIGURES 4 through 8:

Certain fenders are of such construction that it is not practical to attach the baffle directly to the rear wall of the headlight casing 7 and to connect the projection 16 to the flange 6. FIGURES 4 through 7 assume (with a schematic showing) fenders of this character and show the manner in which the baffle has support from the casing 7 and the flanges 6. In these figures the showing of the parking light units 10 has been omitted for simplicity of illustration. The baffle is of the construction above described except that it carries a grommet 21a for each of the cables 22. Since the fenders of different makes and models of automobiles vary in a number of respects as to their detail features, the extent of the spacing of the baffle from the casings 7 and 9 will also vary for different fenders and is determined in accordance with the particular design of the fender to which the baffle is applied. As in the construction above described, the baffle provides the occluded chamber 12 within which the casings of the headlight and parking light units are positioned.

In this construction the support for the baffle from the rear wall of the headlight casing 7 is effected by a bracket designated generally as 28 and shown in detail in FIGURE 6. The bracket 28 has similarly formed front and rear attachment members 29 and 30, which are respectively connected to the rear wall of the casing 7 and to the baffle 11. The member 29 includes a vertical plate 31 and a horizontal plate 32 which projects rearward from the plate 31, the plate 31 being attached by screws 15a to the rear wall of the casing 7. The member 30 includes a vertical plate 33 and a horizontal plate 34 which projects forward from the plate 33, the plate 33 being attached preferably by bolt and nut fastenings 15b to the baffle 11. The extent of the spacing of the baffle from the headlight casing 7 is determined by a horizontal strap 35 which may be cut to a suitable length from an indefinitely long strip of metal S (FIGURE 8) having a central longitudinal row of closely associated openings 36. The end portions of the strap 35 extend under the plates 32 and 34 and are connected to these plates by bolt and nut fastenings 37, the bolts of which in each instance extend through one of the holes 36.

The support for the baffle from the flanges 6 consists of a strap 38 which is cut to the required length from the strip S and is attached at its forward end by a bolt and nut fastening 39 to the flanges 6 and at its rear end by a bolt and nut fastening 40 to the projection 16 of the baffle 11.

The baffle is of such construction that it may be economically produced and quickly and easily fitted within the fender chamber and secured free from vibration and noise in its position behind the casings of the headlight and parking light units in which position, cooperating with the fender walls and the skirt to delimit the occluded chamber 12, it presents a physical barrier to the access of debris to the casings of the headlight and parking light units.

I claim:

1. In combination, a front fender of a vehicle, said fender having a top wall, an outer side wall, an inner wall depending from the top wall and a front wall, said walls defining a fender chamber located above a front vehicle wheel, said front wall having near its lower end a rearwardly directed horizontal flange, a headlight unit supported within the fender chamber by said front wall, said headlight unit having a casing located behind said front wall, a headlight protecting baffle in the form of a plate conforming in outline and substantially conforming in dimensions to the cross-sectional outline and dimensions of said fender chamber, said baffle being supported within said fender chamber by the walls thereof in a substantially vertical transverse plane behind the casing of the headlight unit and with its edges adjacent to the walls of the fender chamber to define at the front end of the fender a chamber in which the headlight unit is positioned and which is occluded from the part of the fender chamber behind the baffle to present a physical barrier to debris picked up by the front vehicle wheel from the road surface and thrown forwardly toward said fender chamber, thereby to prevent its passage into the occluded chamber, the baffle having a rearwardly directed plate-like horizontal projection connected to the flange of the front wall of the fender chamber for supporting the baffle, said baffle being connected to and supported by the casing of the headlight unit, said baffle including spaced flange means provided at the edge portions thereof and extending angularly therefrom, said last-mentioned spaced flange means being connected to and supported by said inner wall of the front fender, said baffle including outwardly extending resilient sealing means secured to portions of the edge portion thereof and engaging the adjacent fender wall portions to provide an effective seal between the baffle and the wall portions of the fender, the lowermost portion of said baffle being spaced from the lowermost portion of said front wall of the fender.

2. Apparatus as defined in claim 1, wherein said baffle includes an elongated stiffening rib spaced inwardly from the outer edges thereof for preventing vibration and noise during use.

3. Apparatus as defined in claim 1, wherein said baffle is spaced behind the casing of the headlight unit and is connected thereto by a bracket, the bracket comprising spaced attachment members each having vertical and horizontal plates with the vertical plates connected respectively to the casing of the headlight unit and to the baffle and with the horizontal plates projecting toward one another and a metal strap extending between and connected to the horizontal plates.

References Cited in the file of this patent

UNITED STATES PATENTS

| | | |
|---|---|---|
| D. 177,532 | Meyer et al. | Apr. 24, 1956 |
| 2,007,599 | Fageol | July 9, 1935 |
| 2,147,734 | Dickson | Feb. 21, 1939 |
| 2,261,187 | Scribner | Nov. 4, 1941 |
| 2,338,541 | Roedding | Jan. 4, 1944 |
| 2,940,064 | Wilfert | June 7, 1960 |